United States Patent
Pan et al.

(10) Patent No.: US 8,428,355 B2
(45) Date of Patent: Apr. 23, 2013

(54) IMAGE FILE PROCESSING METHOD

(75) Inventors: Chia-Ho Pan, Tainan (TW); Po-Jung Lin, Kaohsiung (TW); Shuei-Lin Chen, Kaohsiung (TW); Yen-Ping Teng, Tainan (TW); Kuo-Chun Hung, Hsinchu (TW)

(73) Assignee: Altek Corporation, Hsinchu (TW)

( * ) Notice: Subject to any disclaimer, the term of this patent is extended or adjusted under 35 U.S.C. 154(b) by 180 days.

(21) Appl. No.: 13/085,564

(22) Filed: Apr. 13, 2011

(65) Prior Publication Data

US 2011/0255783 A1  Oct. 20, 2011

(30) Foreign Application Priority Data

Apr. 16, 2010  (TW) .............................. 99112071 A

(51) Int. Cl.
*G06K 9/34* (2006.01)

(52) U.S. Cl.
USPC ....................................................... 382/173

(58) Field of Classification Search .......... 382/232–233, 382/238, 244–248, 250–251; 358/426.01–426.02, 358/426.07, 426.12–426.14; 348/394.1–395.1, 348/403.1–404.1, 407.1–416.1, 420.1–421.1; 375/240.02–240.03, 240.11–240.25, 430.1–431.1, 375/E7.226, E7.243, E7.258–E7.259, E7.201

See application file for complete search history.

(56) References Cited

U.S. PATENT DOCUMENTS

| | | | | |
|---|---|---|---|---|
| 6,144,763 A * | 11/2000 | Ito | | 382/166 |
| 7,440,627 B2 * | 10/2008 | Kim | | 382/233 |
| 7,480,418 B2 | 1/2009 | Niemi et al. | | |
| 7,589,852 B2 * | 9/2009 | Niida | | 358/1.15 |
| 2004/0003403 A1 * | 1/2004 | Marsh | | 725/53 |

\* cited by examiner

*Primary Examiner* — Jose Couso
(74) *Attorney, Agent, or Firm* — Morris Manning & Martin LLP; Tim Tingkang Xia, Esq.

(57) ABSTRACT

An processing method is used for processing an image file of an image, in which the image is divided into a plurality of image blocks, and at least one row of the minimum coded units sequentially define the image as a plurality of bands. The processing method includes the following steps. An image file of an image is supplied, in which the image file includes a bit stream and exchangeable image file (EXIF) data. A band indicator of the EXIF data is read according to an expanded range. A segment in the bit stream corresponding to a band encompassed by the expanded range is decoded according to the read band indicator corresponding to the band of the expanded range, so as to obtain the band.

9 Claims, 5 Drawing Sheets

IMAGE FILE PROCESSING METHOD

CROSS-REFERENCE TO RELATED APPLICATIONS

This non-provisional application claims priority under 35 U.S.C. §119(a) on Patent Application No. 099112071 filed in Taiwan, R.O.C. on Apr. 16, 2010, the entire contents of which are hereby incorporated by reference.

BACKGROUND OF THE INVENTION

1. Field of the Invention

The present invention relates to an image file processing method, and more particularly to a method for decoding a portion of an image file.

2. Related Art

A digital camera captures an image by using an optical sensor, converts the image into a digital signal, and then stores the captured image as an image file in a digital file format. Currently, Joint Photographic Experts Group (JPEG) is one of the most commonly used image file formats, and image files in JPEG format have been used in most digital cameras and other digital photograph products.

After the image is captured, a user usually reviews the image file stored in the digital camera. However, no matter how high the resolution of the image in the digital camera is, the user can only view a reduced resolution image through a small-size display screen. Therefore, when the user intends to view a portion of range in the image in detail, the user may zoom in the image, so as to view details of the portion of the image.

However, even if it only needs to zoom in and present a portion of the range in the image to the user, the most direct processing method is to decode the entire image file back into a full resolution image, and then display the portion of the image designated by the user. This method requires provision of a memory capable of accommodating the full resolution image, resulting in large consumption of memory capacity, memory bandwidth accessing, and operation resource during image decoding. When the image resolution increases rapidly, it results in an increased burden of decoding.

In order to reduce the required memory capacity, it is considered that only a portion of the range in the image is decoded and displayed to the user. For relevant technologies, reference may be made to, for example, U.S. Pat. No. 7,480,418. As compared with the original file, the conventional method increases the size of the image file due to overhead, and affects the data compression ratio. Moreover, the processed image file needs more information than general image compression standard. It is not applicable to existing general decoders (for example, JPEG decoders), so that the compatibility is lost.

Therefore, a heretofore unaddressed need exists in the art to address the aforementioned deficiencies and inadequacies.

SUMMARY OF THE INVENTION

The present invention relates to an image file processing method, which can solve the problem in the prior art. For example, it requires large consumption of memory capacity, memory bandwidth accessing, and operation resource during decoding only a portion of range in an image. Besides, the prior art has an excessive overhead, and/or cannot be applied to existing decoders.

The image file processing method of the present invention is used for decoding a portion of the range in an image according to an expanded range, so as to display a portion of the image selected by the expanded range.

Firstly, an image file of the image is provided. The image is divided into a plurality of image blocks, and at least one row of the minimum coded unit (MCU) sequentially define as a band. The image file comprises a bit stream and exchangeable image file (EXIF) data. The image file format may be a JPEG format.

The bit stream may use Huffman coding scheme to represent the image. The bit stream has a plurality of segments individually corresponding to the bands of the image, and a plurality of restart markers (RSTm or RM) respectively located after the segments except the last segment. Values of the RMs may be 0xFFD0 to 0xFFD7 sequentially. Each segment has a non-differential DC coefficient, and the non-differential DC coefficient is corresponding to the first image block of the band.

The EXIF data comprises a plurality of band indicators. The band indicators are individually corresponding to the bands, and each band indicator is used for indicating a position of the segment corresponding to the corresponding band in the bit stream. In addition, the EXIF data may further comprise at least one capturing parameter when the image is captured. The capturing parameter may be a camera model, a focal length, an image capturing day and time, an exposure time, an f-number, a photosensitivity, or a metering mode.

Then, the image file processing method comprises the following steps. At least one band indicator is read according to an expanded range for selecting local blocks of the image. At least one segment in the bit stream corresponding to at least one band encompassed by the expanded range is decoded according to the read band indicator corresponding to the band encompassed by the expanded range, so as to obtain at least one band. The image file processing method may further comprise displaying the portion of the image corresponding to the expanded range. The displayed portion could be a portion of the image selected by the expanded rage.

The band indicator may record a segment length of the corresponding segment, or a segment starting position of the corresponding segment in the bit stream. Relative addresses or absolute addresses of the band indicators may be the same length of bits or follow a fixed format, so as to reduce the variety of decoding and accelerate the processing of the image file.

In addition, in order to enable the image file to be applicable to existing decoders, every 8 consecutive bands are defined as a large band, and every 8 corresponding consecutive segments are defined as a large segment. Values of the RMs of the segments in each large segment may be sequentially 0xFFD0, 0xFFD1, 0xFFD2, 0xFFD3, 0xFFD4, 0xFFD5, 0xFFD6, and 0xFFD7.

Based on the above, the image file processing method of the present invention can decode only the segment of the bit stream corresponding to the band which is encompassed by the expanded range. Therefore, the image file processing method of the present invention does not need to decode the entire image back into full resolution, thereby saving the memory capacity, the memory bandwidth accessing, and the operation resource during decoding. In the image file processing method of the present invention, the band indicators of the image file are stored in the EXIF data, which is attached in the JPEG file, while the bit stream part still complies with JPEG specifications, and thus the image file is compatible with existing JPEG decoders. Furthermore, as compared with the conventional method, in the image file processing method of the present invention, the overhead caused by the band indicators added in the EXIF data is quite small, so that the image file can have good data compression ratio.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

An image file processing method of the present invention is used for decoding a portion of range in an image according to an expanded range (also referred to as a window of interest (WOI)), so as to display a portion of the image selected by the expanded range. The portion of the image file refers to a part of a single image file.

Figure 1:
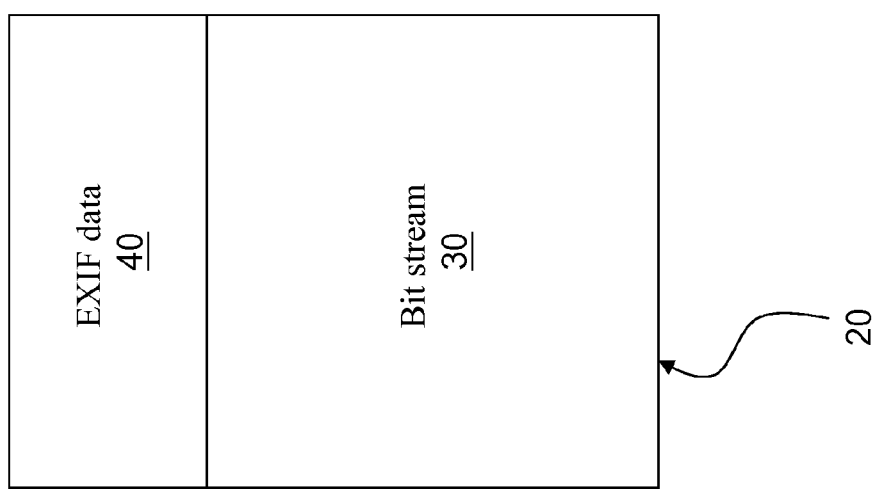
FIG. 1 is a schematic view of an image file according to an embodiment of the present invention.

FIG. 1 is a schematic view of an image file according to an embodiment of the present invention.

Referring to FIG. 1, an image file 20 comprises a bit stream 30 and EXIF data 40. The image file 20 may be in a JPEG format; however, the present invention is not limited to the JPEG format, but encompasses any image file 20 that can achieve the objective.

Figure 2:
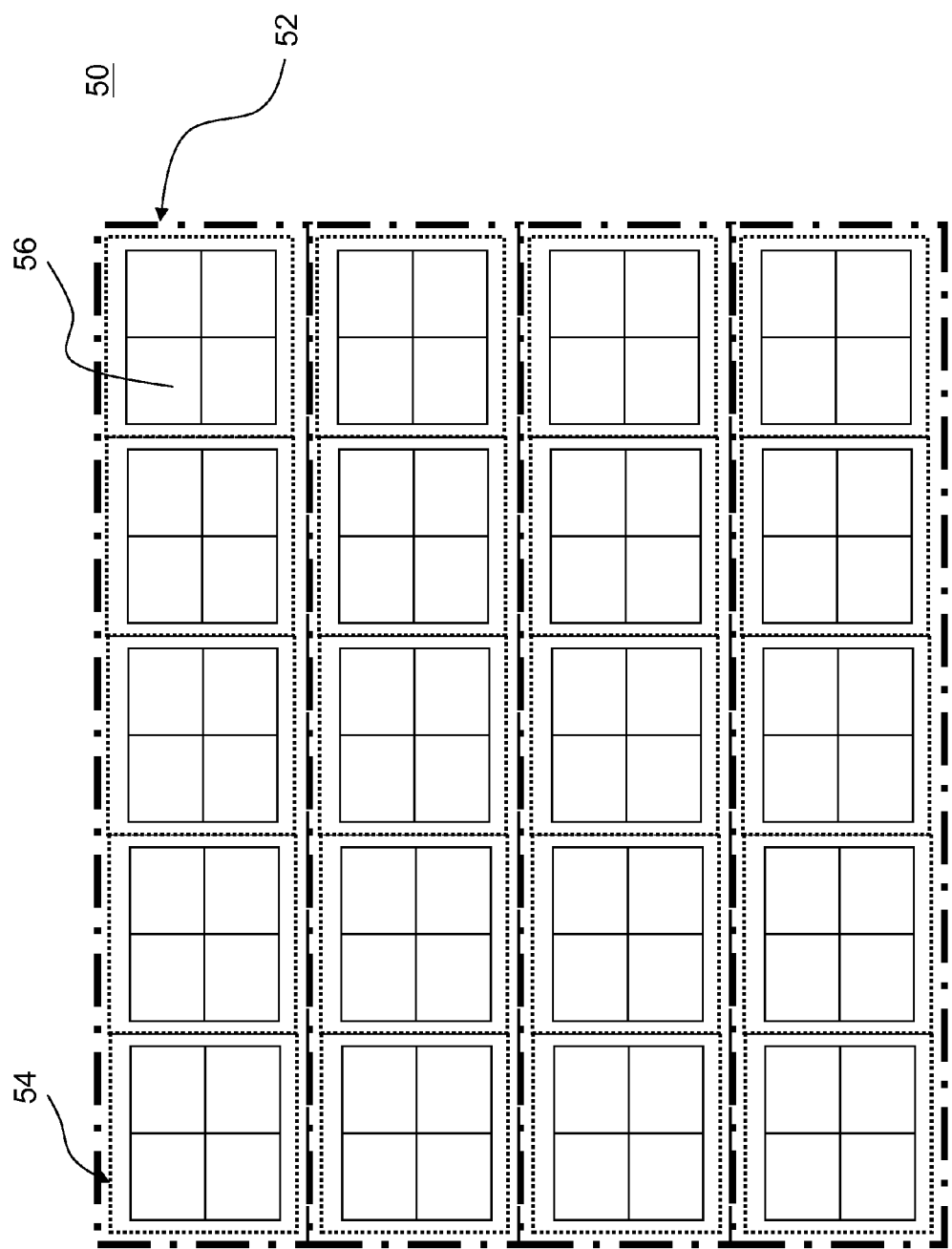
FIG. 2 is a schematic view of an image according to an embodiment of the present invention.
Figure 3:
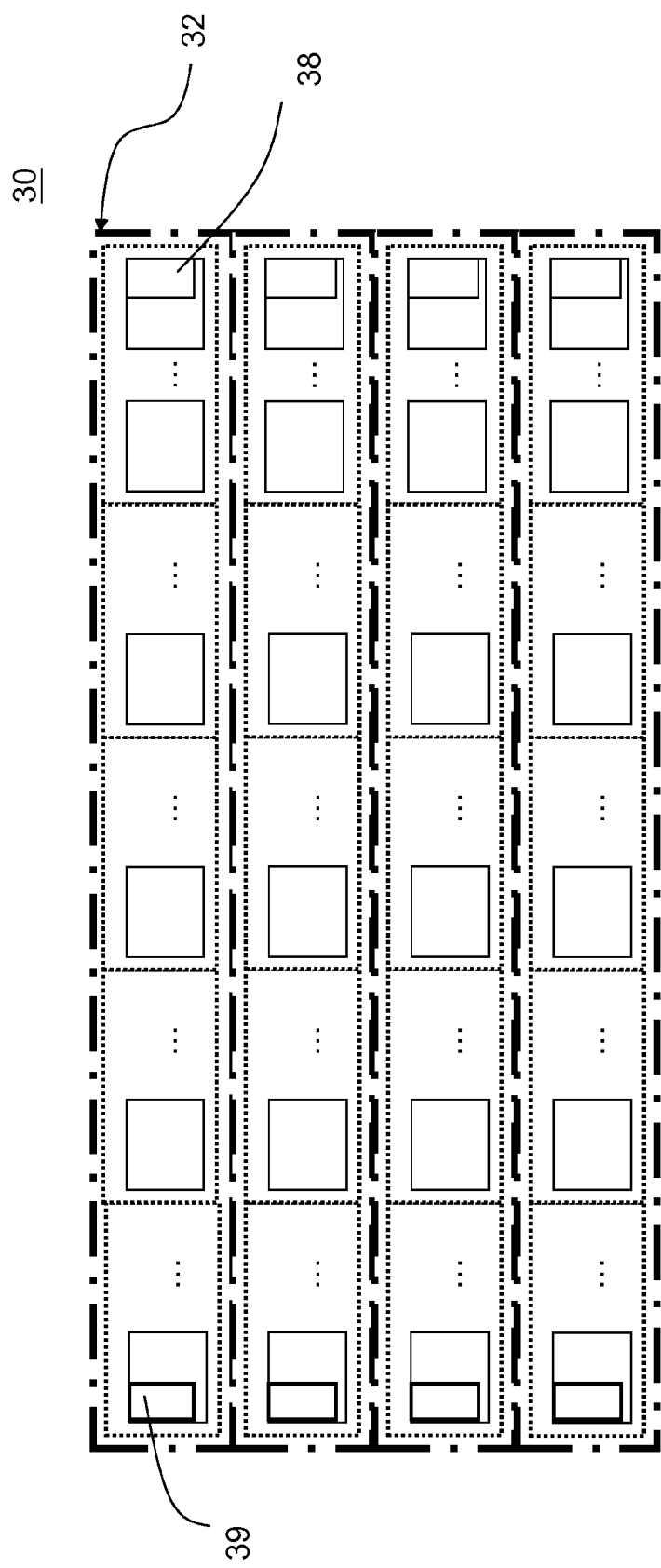
FIG. 3 is a schematic view of a bit stream according to an embodiment of the present invention.

FIG. 2 is a schematic view of an image according to an embodiment of the present invention, and FIG. 3 is a schematic view of a bit stream according to an embodiment of the present invention.

Referring to FIGS. 2 and 3, an image 50 is divided into a plurality of consecutive image blocks 56, and at least one row of the MCU 54 sequentially define the image 50 as a plurality of bands 52. That is to say, the bands 52 comprise at least one row of the MCU 54. For example, one or more image blocks 56 may be coded as MCU 54, and one row of the MCUs 54 sequentially define as the bands 52.

The image 50 may be represented as the $YC_bC_r$ color space. $Y$, $C_b$, and $C_r$ of the $YC_bC_r$ color space respectively represent luminance, blue chrominance (also referred to as chroma), and red chrominance values of a pixel in the image 50. Each MCU 54 may be represented by the $YC_bC_r$ color space as at least one data unit. Many sampling methods are used for coding the image 50. For example, the sampling method of "4:2:0" means that one MCU 54 comprises 4 image blocks 56, and one MCU 54 is represented by 6 data units of the luminance of the 4 image blocks 56, and one blue chrominance and one red chrominance between the image blocks 56.

The image 50 may be coded as bit stream 30 by Huffman coding scheme. In the JPEG image standard, each compressed data unit may be represented by one DC coefficient and 63 AC coefficients. The DC coefficient in the bit stream 30 may be non-differential form or differential form. The differential image DC coefficient records a difference between the DC coefficients of the current data unit and the previous data unit. The non-differential DC coefficient represents that the DC coefficient is the original value without making the difference.

The bit stream 30 has a plurality of segments 32 individually corresponding to the bands 52 of the image 50, and the segments 32 comprise all coded data units in the bands 52. The bit stream 30 also has a plurality of restart markers (RSTm or RM) 38 respectively located after the segments 32 except the last segment, and values of the RMs 38 may be 0xFFD0 to 0xFFD7 sequentially. Besides, the bit stream 30 has an end of file (EOF) located after the last segment, and the EOF may be 0xFFD9.

Each segment 32 in the bit stream 30 has a non-differential DC coefficient 39, that is, the non-differential DC coefficient 39 is corresponding to the first image block 56 of the band 52 corresponding to the starting position of the segment 32. In detailed description, the non-differential DC coefficient 39 is an image DC coefficient in the first MCU 54 of the band 52 corresponding to the segment 32.

In the JPEG specifications, each RM 38 is followed by the non-differential DC coefficient 39, so that the image file 20 complies with the JPEG specifications, and thus can be expanded by existing common JPEG decoders back into the full resolution image 50 in a conventional manner.

Figure 4:
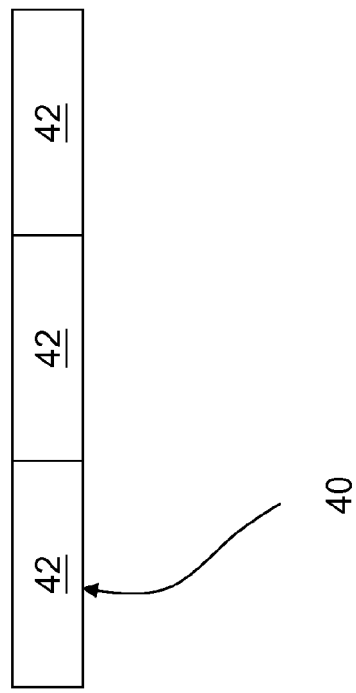
FIG. 4 is a schematic view of EXIF data according to an embodiment of the present invention.

FIG. 4 is a schematic view of EXIF data according to an embodiment of the present invention. Referring to FIG. 4, the EXIF data 40 of the image file 20 comprises a plurality of band indicators 42. The band indicators 42 are individually corresponding to the bands 52, and each band indicator 42 is used for indicating a position of the segment 32 corresponding to the corresponding band 52 in the bit stream 30. The band indicator 42 may record a segment length of the corresponding segment 32, or a segment starting position of the corresponding segment 32 in the bit stream 30. That is to say, the band indicators 42 can address the segment 32 of corresponding bands 52 by recording relative addresses or absolute addresses. The relative addresses or absolute addresses of all the band indicators 42 may be of the same length of bits or follow a fixed format, so as to reduce the difficulty of decoding and accelerate the processing of the image file 20.

However, in the image file 20, the band indicators 42 may also address the segment 32 of corresponding bands 52 by using absolute addresses or relative addresses in a mixed manner. As long as the relationship between absolute addresses or relative addresses are following a predefined manner, such as fixed interleaving manner of absolute addresses and relative addresses, it can be known that the next band indicator 42 uses an absolute address or a relative address. Therefore, the relative addresses or absolute addresses of the band indicators 42 may also be of different lengths of bits, for example, the length of the relative addresses may be shorter than absolute addresses.

In addition, the EXIF data 40 may further comprise at least one capturing parameter when the image 50 is captured. The capturing parameter may be a camera model, a focal length, an image capturing day and time, an exposure time, an f-number, a photosensitivity, or a metering mode.

Figure 5:
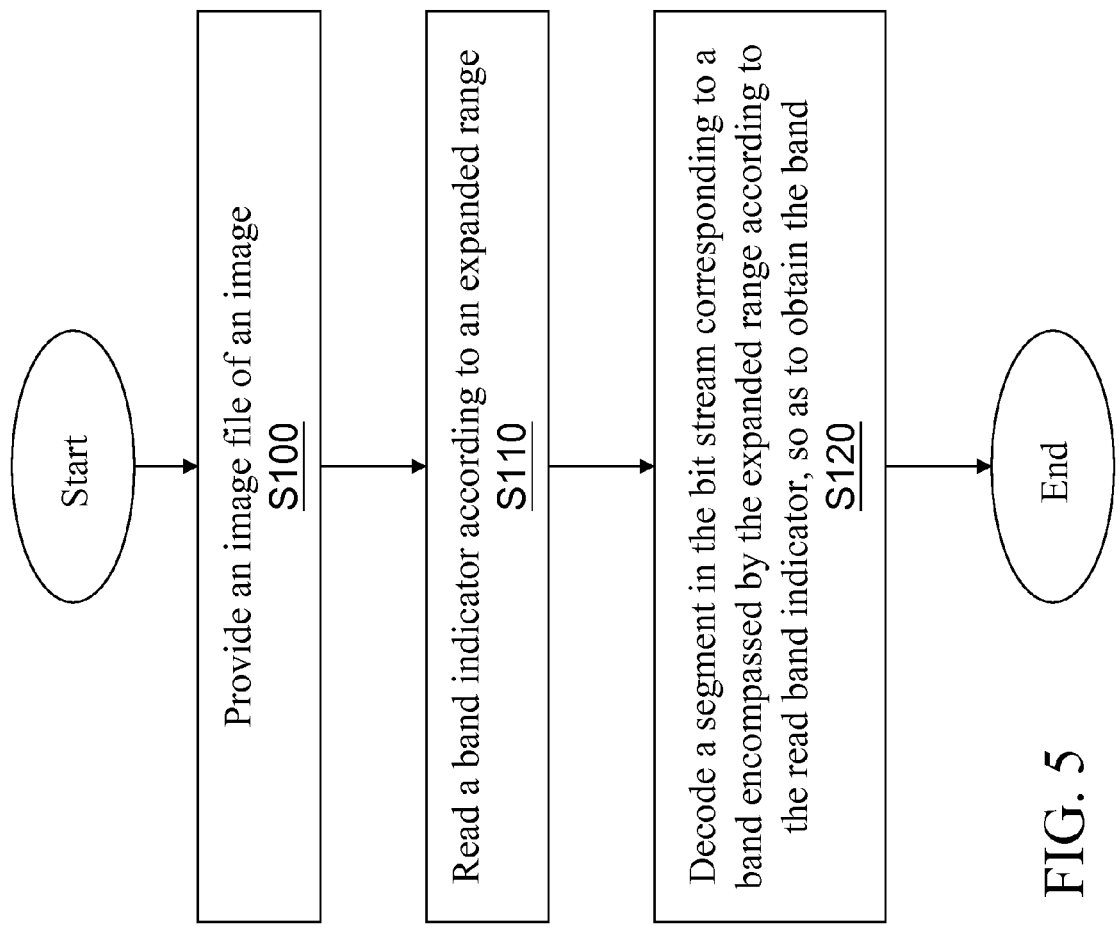
FIG. 5 is a flow chart of an image file processing method according to an embodiment of the present invention.
Figure 6:
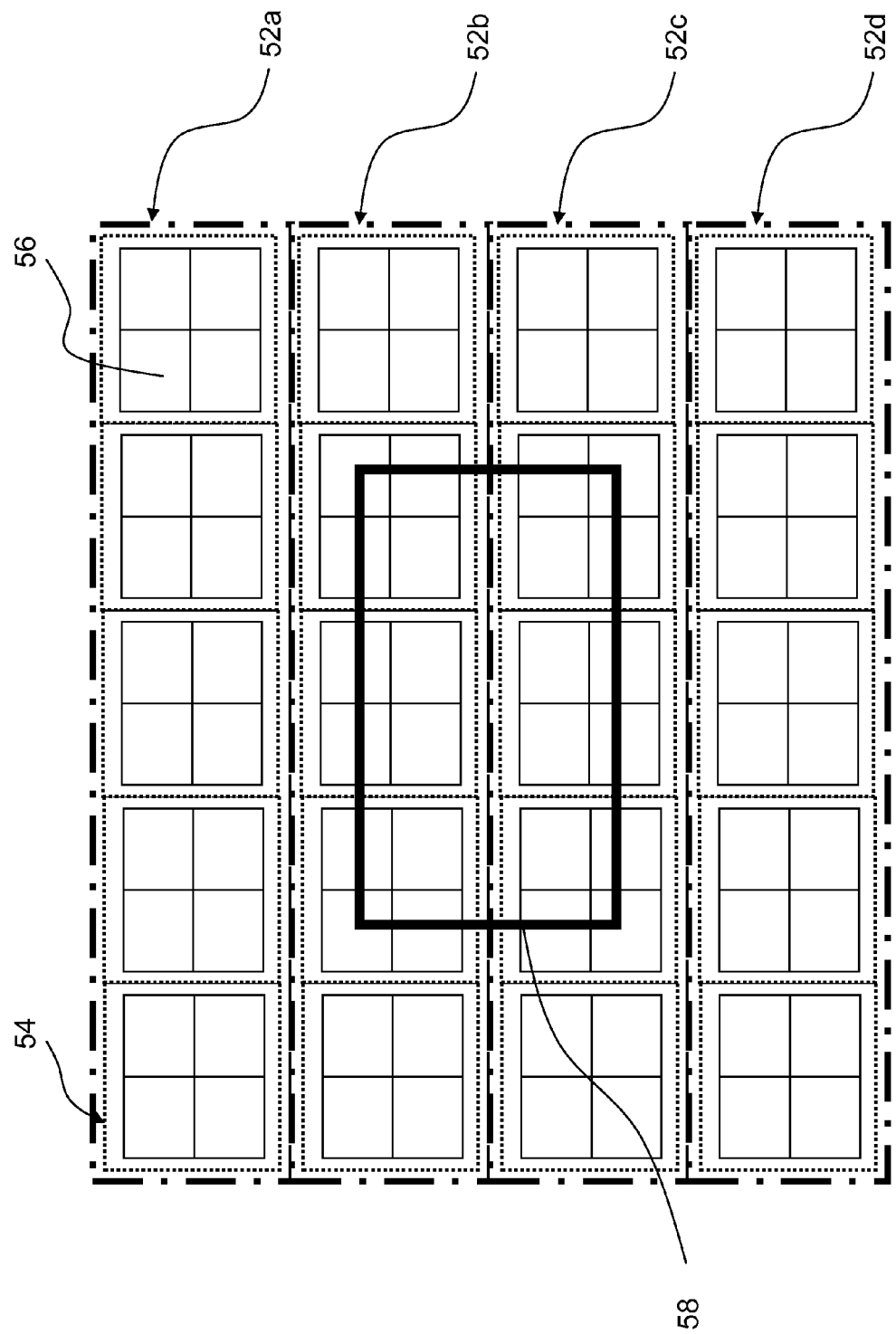
FIG. 6 is a schematic view of an expanded range according to an embodiment of the present invention.

FIG. 5 is a flow chart of an image file processing method according to an embodiment of the present invention, and FIG. 6 is a schematic view of an expanded range according to an embodiment of the present invention. The steps of processing the image file 20 by the image file processing method of the present invention is described in detail with reference to FIGS. 5 and 6. The image file processing method can decode a portion of the bit stream 30 according to the expanded range 58, so as to obtain the portion of the image in the expanded range 58.

Firstly, the compressed image file 20 of the image 50 as described above (Step S100) and the selected expanded range 58 are provided. The expanded range 58 may be defined by the user, and the expanded range 58 encompasses at least one band 52. Then, the band indicator 42 corresponding to the band 52 is read from the EXIF data 40 according to the expanded range 58 (Step S110). For example, in FIG. 6, the image 50 comprises bands 52a, 52b, 52c, and 52d, and the expanded range 58 encompasses the bands 52b and 52c. Therefore, in Step S110, the band indicators 42 are read to obtain the positions of the segments 32 corresponding to the bands 52b and 52c in the bit stream 30.

When the band indicators 42 record the segment starting positions of the corresponding segments 32 in the bit stream 30, absolute positions of the segments 32 corresponding to the bands 52b and 52c in the bit stream 30 can be directly obtained by reading the band indicators 42 corresponding to the bands 52b and 52c. When the band indicators 42 record the segment lengths (being considered as relative positions of the corresponding segments 32 in the bit stream 30) of the corresponding segments 32, all the band indicators 42 before the band indicator 42 corresponding to the band 52b also need to be read and then summed up, so as to obtain the absolute positions of the segments 32 corresponding to the bands 52b and 52c in the bit stream 30. That is to say, which bit in the bit stream 30 is the starting bit of the segment 32 can be known by the band indicator 42. Then, at least one segment 32 in the bit stream 30 corresponding to at least one band 52 is decoded according to the read band indicator 42 and the band 52 encompassed by the expanded range 58, so as to obtain the portion of the image of at least one band 52 (Step S120).

The corresponding segment 32 can be found according to the band indicator 42, and all segments 32 in the bit stream 30 before the segment 32 corresponding to the expanded range 58 do not need to be decoded during decoding in Step S120.

After the non-differential DC coefficient 39 at the starting position of the segment 32 corresponding to the expanded range 58 is obtained during decoding, the segment 32 corresponding to the expanded range 58 can be decoded according to the non-differential DC coefficient 39. In the entire bit stream 30, only the segment 32 corresponding to the expanded range 58 is decoded, so as to obtain the band 52 encompassed by the expanded range 58. In addition, the image file processing method may further comprise displaying the portion of the image corresponding to the expanded range 58 in the decoded band 52. That is to say, only the portion of the image in the band 52 selected by the expanded range 58 is displayed for the user to review.

However, some existing decoders can only recognize the value of the first decoding RM 38 as 0xFFD0. In order to enable the image file processing method to be applicable to existing decoders, every 8 consecutive bands 52 are defined as a large band, and every 8 corresponding consecutive segments 32 are defined as a large segment. Most preferably, values of the RMs 38 of the segments 32 in each large segment may be sequentially 0xFFD0, 0xFFD1, 0xFFD2, 0xFFD3, 0xFFD4, 0xFFD5, 0xFFD6, and 0xFFD7. As such, the use of large segment as units can avoid the problem that some inflexible decoders can only identify the first decoding RM 38 having the value of 0xFFD0.

Based on the above, the image file processing method of the present invention reads the band indicators written in the EXIF data, and can decode only the segment of the bit stream corresponding to the band encompassed by the expanded range. Therefore, the image file processing method of the present invention does not need to decode the entire image back into full resolution, and thus can greatly save the memory capacity, the memory bandwidth accessing, and the operation resource required during decoding, thereby greatly reducing the time required for decoding a portion of the image, and reducing the cost required for the image processing. Moreover, in the image file processing method of the present invention, the image file writes the band indicators in the EXIF data, which is attached in the JPEG file, while the bit stream part still complies with the JPEG specifications. Therefore, the image file provided by the present invention is compatible with existing JPEG decoders, thereby maintaining a high compatibility. Furthermore, as compared with the conventional method, in the image file processing method of the present invention, the overhead caused by the band indicators added in the EXIF data is quite small, so that the data compression ratio of the image file can still be maintained.

What is claimed is:

1. An image file processing method, comprising:
providing an image file of an image by a processor, wherein the image is divided into a plurality of image blocks, at least one row of the image blocks are defined as bands, and the image file comprises:
a bit stream, representing the image, wherein the bit stream has a plurality of segments individually corresponding to the bands, and a plurality of restart markers are respectively located after the segments except the last segment; and
exchangeable image file (EXIF) data, comprising a plurality of band indicators, wherein the band indicators are individually corresponding to the bands, and each band indicator is used for indicating a position of the segment corresponding to the corresponding band in the bit stream;
reading at least one band indicator according to an expanded range for selecting local blocks of the image by the processor; and
decoding at least one segment in the bit stream corresponding to at least one band encompassed by the expanded range according to the read band indicator corresponding to the band encompassed by the expanded range by the processor, so as to obtain at least one band.

2. The image file processing method according to claim 1, further comprising:
displaying a portion of the image corresponding to the expanded range.

3. The image file processing method according to claim 1, wherein the band indicator records a segment length of the corresponding segment.

4. The image file processing method according to claim 1, wherein the band indicator records a segment starting position of the corresponding segment in the bit stream.

5. The image file processing method according to claim 1, wherein every 8 consecutive bands are defined as a large band, and every 8 corresponding consecutive segments are defined as a large segment.

6. The image file processing method according to claim 5, wherein values of the restart markers of the segments in each large segment are sequentially 0xFFD0, 0xFFD1, 0xFFD2, 0xFFD3, 0xFFD4, 0xFFD5, 0xFFD6, and 0xFFD7.

7. The image file processing method according to claim 1, wherein the EXIF data further comprises at least one capturing parameter when the image is captured.

8. The image file processing method according to claim 7, wherein the capturing parameter is a camera model, a focal length, a capturing day and time, an exposure time, an f-number, a photosensitivity, or a metering mode.

9. The image file processing method according to claim 1, wherein relative addresses or absolute addresses of the band indicators are of the same length of bits.

* * * * *